United States Patent [19]

Dalton

[11] Patent Number: 5,051,607

[45] Date of Patent: Sep. 24, 1991

[54] SWITCH TIME DELAY APPARATUS

[76] Inventor: John E. Dalton, 489-22.25 Rd., Grand Junction, Colo. 81503

[21] Appl. No.: 548,563

[22] Filed: Jul. 5, 1990

[51] Int. Cl.$^5$ .................... H01H 43/02; H05B 39/00
[52] U.S. Cl. .................................. 307/141; 323/323; 315/360
[58] Field of Search ............... 307/141, 141.4, 141.8, 307/143, 510, 593, 597, 603; 361/196; 323/323, 324; 315/360, 362, 291, 194, 199

[56] References Cited

U.S. PATENT DOCUMENTS

| | | | |
|---|---|---|---|
| 3,943,375 | 3/1976 | Williamson | 307/141 |
| 4,002,925 | 1/1977 | Monahan | 307/141 |
| 4,082,961 | 3/1978 | Geniut | 315/194 |
| 4,160,192 | 7/1979 | McAllise | 315/194 |
| 4,204,149 | 5/1980 | Cleary et al. | 307/141.4 |
| 4,259,618 | 3/1981 | Nilssen | 315/360 |
| 4,336,464 | 6/1982 | Weber | 307/141.4 |
| 4,349,748 | 9/1982 | Goldstein et al. | 307/140 |
| 4,389,599 | 6/1983 | Jabor | 315/360 |
| 4,494,012 | 1/1985 | Coker | 315/360 |
| 4,500,795 | 2/1985 | Hochstein et al. | 307/141 |
| 4,508,997 | 4/1985 | Woodnutt | 315/360 |
| 4,521,843 | 6/1985 | Pezzolo et al. | 364/145 |
| 4,540,984 | 9/1985 | Waldman | 340/825 |

FOREIGN PATENT DOCUMENTS 2013049  2/1979  United Kingdom .

Primary Examiner—J. R. Scott
Assistant Examiner—Richard Elms
Attorney, Agent, or Firm—Mallinckrodt & Mallinckrodt

[57] ABSTRACT

A time delay apparatus configured to connect in parallel with a common single pole switch. For time delay operation the switch is toggled on and off again within a short time span defined as the trigger window period. This triggering results in the circuit providing power to the load for a period of time predetermined by the user, after which the circuit automatically interrupts power to the load. For manual operation the switch is turned on and left on longer than the trigger window period, after which turning the switch off results in interruption of power to the load similar to a standard wall switch.

28 Claims, 2 Drawing Sheets

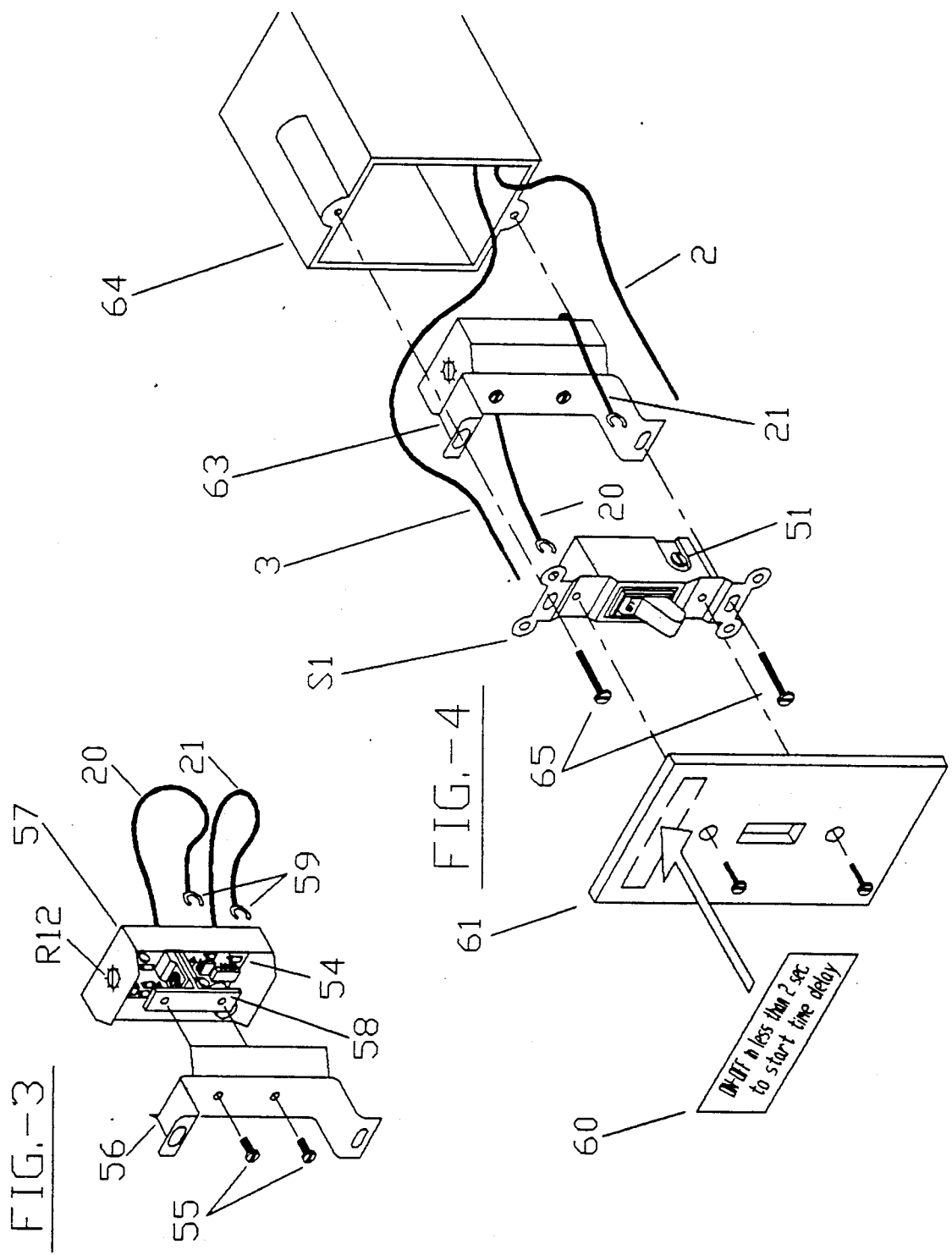

SWITCH TIME DELAY APPARATUS

FIELD OF THE INVENTION

The technical field of the invention is wall-mounted timers which turn off associated loads after a prescribed interval of time.

BACKGROUND OF INVENTION

A variety of devices providing delayed turn off and intended as replacements for wall mounted switches have long been known in the art. These devices have proven quite useful in automatically controlling electrical devices such as garage or bedroom lights.

U.S. Pat. No. 4,389,599 issued to Jabor is typical of many such devices and discloses a delay circuit for delaying the turn off of a light bulb after the switch has been turned off. The Jabor device includes two leads to be connected in parallel with an existing single pole switch, however there is no option provided for manual operation which would allow use of the switch without initiation of the delayed turn off. The delayed turn off operates whenever the switch is turned off.

U.S. Pat. No. 4,494,012 issued to Coker is typical of other prior art devices and shows a timer device including a manual switch having "on", "off" and "timer" positions. This timer is configured as a direct replacement for existing wall-mounted switch units. It therefore has the desirable option of manual or automatic operation but uses an integral three position switch means to provide this option. Therefore the consumer is obligated to replace the existing wall mounted switch with the three position switch and compatible face plate which may not satisfy aesthetic requirements or match existing decor and also represents an added expense for the consumer. Also there is no provision for adjustment of the time delay period to meet the specific requirements of the operator.

Accordingly, a primary objective of the present invention is to provide a new and improved circuit for the optional delayed turn off of electrical loads such as lights.

SUMMARY OF THE INVENTION

According to the invention, an apparatus allowing the selective use of a delayed turn off function with electrical loads, such as lights, includes two leads adapted to be connected across the terminals of a common single pole type switch so that the apparatus is connected electrically in parallel with the switch. An electrically controlled switching means is provided for powering the load when such switching means is activated and the single pole type switch is open. Control means including power supply means and control timer means is responsive to toggling on and off of said single pole type switch within a preset trigger window period, such as about two seconds, to produce an output signal enabling the electrically controlled switching means to the on condition for a predetermined time delay period, after which said switching means is disabled to the off condition. Normal operation of the switch, i.e., turning the switch on for a period of time longer than the trigger window period, will not result in operation of the electrically controlled switching means. Thus, if the apparatus is connected across a switch controlling a light and if the switch is turned on and then off again within the trigger window period, the light will remain on for the predetermined time delay period before automatically going off. If the switch is turned on and left on beyond the trigger window period the light will go off in the normal manner when the switch is turned off. There is no requirement for a common side of the power line to be connected to the circuit. This allows for use of the circuit as a compact, low cost addition to an existing single pole type wall switch.

In a preferred embodiment of the invention, the power supply means is connected in parallel across the switch controlling the load so with the switch open, line voltage is supplied to the power supply, but with the switch closed, line voltage is shorted through the switch and no voltage is applied to the power supply. The power supply includes a power storage means, such as a capacitor, so that the power supply will supply power to the apparatus during the time the switch is open and for a short time after the switch is closed. The short time after the switch is closed during which power is still provided to the apparatus provides the trigger window period.

A line voltage detector is provided to determine the presence of line voltage across the switch, i.e., whether the switch is open or closed, and to provide a signal to the control timer means upon closing of the switch. This indicates that timing of the time delay period should begin. The line voltage detector may advantageously take the form of a square wave generator and trigger timer. The control timer requires power from the power supply for operation. Thus, upon closure of the switch, the line voltage detector causes the control timer to start timing the time delay period. During this time, the control timer supplies a control signal to the electrically controlled switching means to activate such means. The electrically controlled switching means, preferably a triac, operates in a manner to allow the line voltage to be applied to the load, but with a periodic, short, initial build up of voltage across such electrically controlled switching means to maintain power to the power supply. If the switch controlling the load is opened within the trigger window period, the power supply continues to supply power to the control timer which supplies the control signal to the electrically controlled switching means for duration of the time delay period. If the switch controlling the load is not opened within the trigger window period, the power supply runs out of stored power and operation of the control timer ceases which terminates the control signal to the electrically controlled switch. Thereafter, when the switch controlling the load is opened, power to the load stops.

In the preferred embodiment of the invention, the electrically controlled switching means and the power supply are connected in parallel with the switch and the voltage across the switch will be the same as the voltage across the electrically controlled switching means. The line voltage detector then also determines the presence of line voltage across the electrically controlled switching means. Thus, the operation of the apparatus to provide operation of the load during the time delay period may be based upon sensing of line voltage across the electrically controlled switching means rather than across the switch itself. This allows the apparatus to function to provide delay operation, but without the option for normal operation, when the electrically controlled switching means is connected in the line in series with a switch controlling operation of the load. In such instance, the series switch controlling the load will normally be closed, and voltage will appear across the electrically controlled switching means in the same manner as with the parallel connected switch open. Opening the series switch eliminates voltage across the electrically controlled switching means and then closing the series switch again reestablishes such voltage. Thus, if the series switch is opened and then closed again within the trigger window period, the apparatus operates as described to operate the load for the time delay period. The apparatus of the invention can thus be advantageously used by being connected either in parallel or in series with the switch controlling the load, or in parallel with on switch and in series with another switch.

DESCRIPTION OF DRAWINGS

The best mode presently contemplated for carrying out the invention is illustrated in the accompanying drawings, in which;

FIG. 3, an exploded view of a preferred physical embodiment of the apparatus adapted to be mounted as an addition to a single pole type switch in a standard wall switch receptacle;

FIG. 4, an exploded view showing the insertion of the apparatus of FIG. 3 as an addition to a single pole type switch in a standard wall switch receptacle.

DETAILED DESCRIPTION OF THE ILLUSTRATED EMBODIMENT

Figure 1:
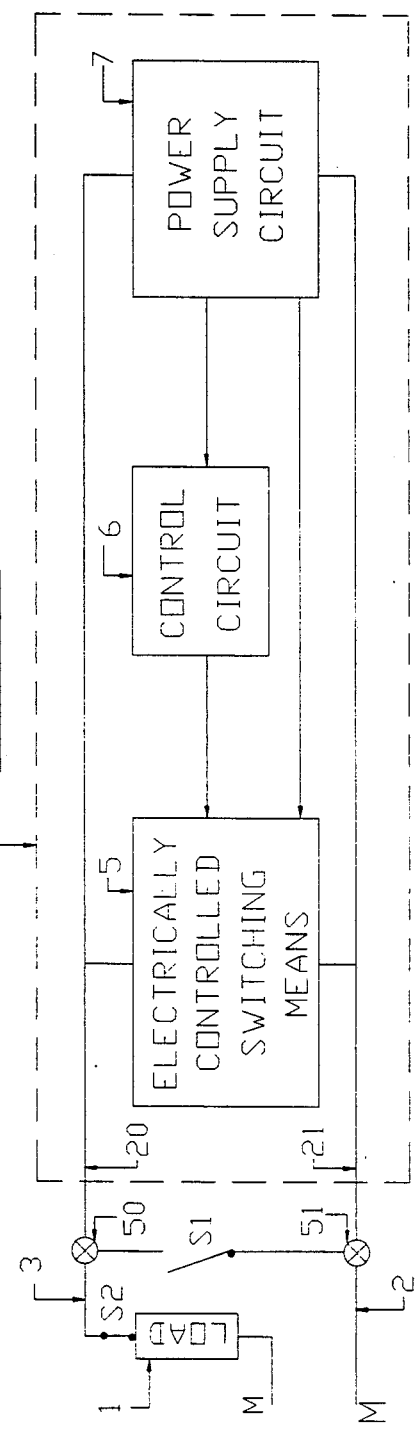
FIG. 1 is a block diagram of the time delay apparatus shown connected electrically in parallel with a switch used to control electrical power from a source thereof to a load.

As shown in block diagram form in FIG. 1 the time delay apparatus 4 in conjunction with switch S1 is used to control power to load 1. Lines 2 and 3 represent one side of the a.c. circuit leading from main power supply M—M to load 1. Typically these lines are already installed and lead to a wall switch receptacle for the purpose of controllably actuating the load. Line 3 connects load 1 to time delay apparatus input line 20 via switch terminal 50. Similarly, line 2 connects the main power source to the other time delay apparatus input line 21 via switch terminal 51.

It is desired that the load 1 (typically a light) be automatically controlled upon triggering of the time delay mode and manually controlled otherwise. Thus, upon triggering of the time delay mode, the time delay apparatus 4 remains in a power on condition until a preset time delay has expired, thereafter reverting to a power off state. Switch S1 is a common single pole type switch which is used for triggering of the time delay mode as well as manual operation of the load. Triggering of the time delay mode is accomplished by performing the following three steps; 1) begin with S1 in the open position 2) close S1, this action marks the beginning of the trigger window period 3) open S1 before the trigger window period has expired. The trigger window period is preferably in the range of about 2 seconds. To the operator, who sees a relatively normal wall switch, this means starting in the "off" position and toggling the switch "on" and "off" again within 2 seconds. It is also desirable that the operator has the option to override the time delay mode. This is accomplished with manual operation which is executed by closing S1 for a period longer than that of the trigger window period. Thus, placing switch S1 in the "on" position for more than 2 seconds allows the system to operate like a standard wall switch, accordingly, when switch S1 is eventually turned "off", power to the load 1 is interrupted.

The overall function of the time delay apparatus 4 is shown in FIG. 1. Consider the three possible situations; off mode, manual operation, and time delay operation.

OFF MODE

When switch S1 is open and time delay apparatus 4 is not in the time delay mode, power line voltage is available to the power supply circuit 7 which in turn provides supply voltage required for the operation of the control circuit 6. Control circuit 6 (being in off mode) provides a low output signal to electrically controlled switching means 5 holding it in the nonconducting state. As a result there is an extremely high impedance presented across the time delay apparatus input lines 20 and 21 preventing current from reaching load 1. This condition typically represents the system at rest when the load is turned off. The power consumption of time delay apparatus 4 in this condition is extremely low and considered negligible.

MANUAL OPERATION

When switch S1 is closed for a period longer than that of the trigger window period, there is a direct circuit connecting load 1 to the main power supply M—M, through switch S1. With switch S1 closed, no power line voltage is available to power supply circuit 7. Power supply circuit 7 provides adequate D.C. supply voltage to control circuit 6, through an internal reserve of power, for a preset period of time which provides the trigger window period. Almost immediately after closure of switch S1, control circuit 6 begins its time out sequence causing its output to go high, thereby providing the necessary input to enable electrically controlled switching means 5 into the conducting state. Allowing the trigger window period to expire, while S1 remains closed, results in depletion of reserve power maintained by power supply circuit 7 to the point where the output of control circuit 6 goes to the low state causing electrically controlled switching means 5 to revert to the nonconducting state. When switch S1 is eventually opened, there is an extremely high impedance presented across time delay apparatus input lines 20 and 21 interrupting current to the load. This condition represents manual operation where current is supplied to the load by closing switch S1 and current to the load is interrupted by opening switch S1 sometime after expiration of the trigger window period. The eventual opening of switch S1 reverts the system back to "off mode".

TIME DELAY OPERATION

When switch S1 is first closed and then reopened within the trigger window period, power line voltage available to power supply circuit 7 is interrupted when switch S1 is closed. As discussed previously, power supply circuit 7, through an internal reserve of power, provides adequate D.C. supply voltage to control circuit 6 for operation during the trigger window period. After closure of switch S1, control circuit 6 begins its time out sequence causing its output to go high providing the necessary input to enable electrically controlled switching means 5 into the conducting state. Opening of switch S1 before expiration of the trigger window period provides an alternate current path to load 1 through electrically controlled switching means 5. Electrically controlled switching means 5, when in the conducting state, allows for passage of current to the load shortly after zero crossing of each half cycle of power line voltage. The slight phase delay of electrically controlled switching means 5 allows voltage across circuit input lines 20 and 21 to build momentarily at the beginning of each half cycle of power line voltage. Power supply circuit 7 utilizes this momentary build up to maintain supply voltage to control circuit 6. Thus when switch S1 is reopened, within the trigger window period, adequate power line voltage is again available to power supply circuit 7 which provides uninterrupted supply voltage for control circuit 6 to continue a high output signal which in turn holds electrically controlled switching means 5 in a conducting state until the preset time delay of control circuit 6 has expired. With electrically controlled switching means 5 in a conducting state, there is an extremely low impedance presented across the circuit input lines 20 and 21 providing current to the load 1. This condition represents time delay operation where the time delay is triggered and current is delivered to the load until control circuit 6 times out according to its preset time delay after which its output reverts to the low state putting electrically controlled switching means 5 in the nonconducting state and interrupting power to the load. The time out of control circuit 6 and resulting interruption of power to the load reverts the system to "off mode".

Figure 2:
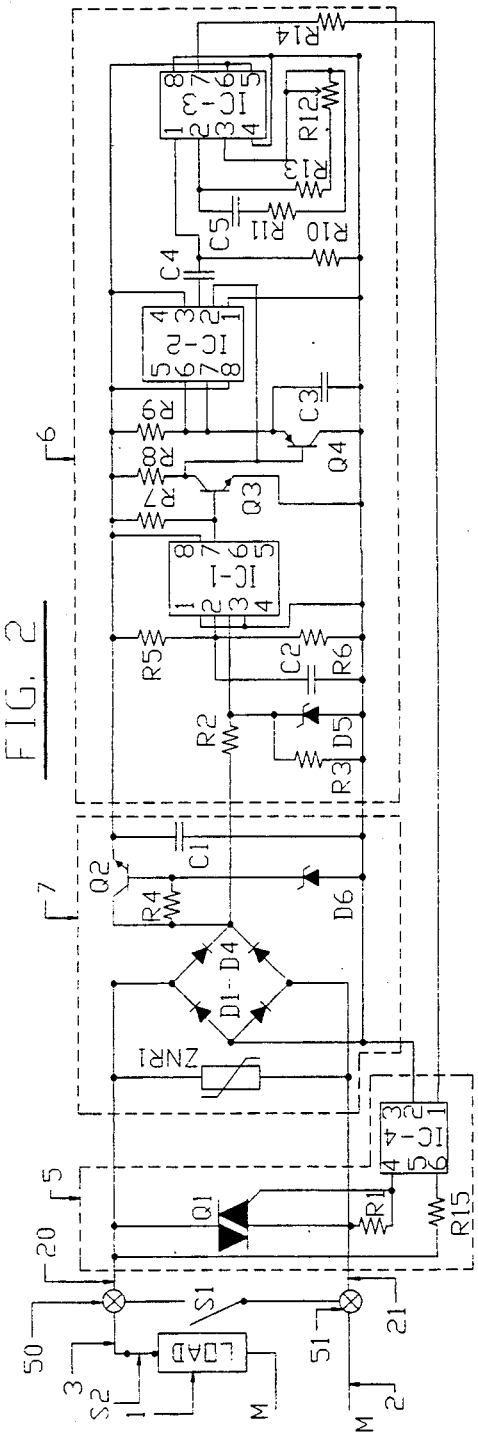
FIG. 2, a schematic circuit diagram of the apparatus of FIG. 1.

Referring now to the detailed schematic circuit shown in FIG. 2 it is noted that when in "off mode" full alternating power line voltage from main power supply M—M is applied across circuit input lines 20 and 21. Power supply circuit 7 uses this power line voltage in providing a regulated D.C. supply voltage to control circuit 6.

Consider basic operation of power supply circuit 7. This circuit carries out the function of supplying required operating voltage to control circuit 6. Varistor ZNR1 suppresses power line transients to within the input limitations of the circuit. A bridge rectifier which consists of diodes D1 through D4 supplies fullwave rectified line voltage to a series regulator transistor Q2 whose bias is established by means of a zener diode D6 providing voltage reference of a fixed level, preferably about 15 volts. Resistor R4 provides current for biasing transistor Q2 and zener diode D6. Capacitor C1 acts as a filter and presents a well regulated D.C. supply voltage across its terminals when switch S1 is open and power line voltage is available across input lines 20 and 21. Upon closure of switch S1, marking the beginning of the trigger window period, power line voltage across input lines 20 and 21 is interrupted and capacitor C1 begins discharging through various current paths in the circuit. As C1 discharges, supply voltage for operation of control circuit 6 diminishes and the end of the trigger window period arrives when supply voltage provided by capacitor C1 drops below the value required to maintain operation of control circuit 6. If switch S1 remains closed, capacitor C1 will eventually discharge completely. Upon opening of switch S1 power line voltage is once again available across input lines 20 and 21 and capacitor C1 recharges rapidly through bridge rectifier D1-D4 and series regulator transistor Q2.

Consider basic operation of the control circuit 6. This circuit actually has two functions. One is, if the time delay has been triggered, to provide a high output signal for a preset time period to electrically controlled switching means 5. The other function is, if the time delay has not been triggered, to ensure a low output signal to electrically controlled switching means 5. Resistors R2 and R3 form a voltage divider with zener diode D5 limiting peak voltage. Thus, when in off mode, for each half cycle of power line voltage said voltage divider encounters a rise in voltage from zero crossing to a peak level (preferably about 5 volts as determined by zener diode D5) and then a subsequent drop in voltage back to zero at the end of the half cycle. Integrated circuit IC1 is a voltage comparator, such as Motorola LM311N, with inverting input connected to said voltage divider comprised of R2, R3 and D5. Resistors R5 and R6 form yet another voltage divider, with capacitor C2 as a filter, which provides a reference input for comparator IC1. The reference input provided by this voltage divider is preferably about 10% of power supply voltage. When in off mode each half cycle of the power line voltage has the effect of producing a square wave at the output of comparator IC1. Resistor R7 is a pull up resistor for the output of IC1 and also provides operating bias for transistor Q3. Resistor R8 is a collector load resistor for transistor Q3. Transistor Q3 acts to invert the output of IC1. The collector of transistor Q3 is also connected to the base of transistor Q4, thus when Q3 is conducting Q4 is also conducting. Integrated circuit IC2 is a common timer circuit, such as Texas Inst. TLC555CN, with resistor R9 and capacitor C3 forming the RC time delay. The trigger of IC2 is connected to the collector of transistor Q3. Each time a square wave is produced through Q3 the negative going edge of the square wave triggers timer IC2. Therefore detection of power line voltage results in production of square waves through Q3 causing the discharge of capacitor C3 through transistor Q4 and the retriggering of timer IC2 for each half cycle of power line voltage. Therefore when in off mode the effect on timer IC2 is continuous retriggering and prevention of threshold voltage from reaching the value of control voltage. Timer IC2 can not time out under these conditions, since the RC time constant formed by R9 and C3, preferably about 0.1 second, is longer than the time required for a half cycle of power line voltage. However, the RC time constant for IC2 must be short enough so that IC2 times out in a time period shorter than generally required to toggle the switch on and then off again. Since IC2 is being retriggered before it is allowed to time out, its output remains high under these conditions. The output of IC2 is coupled to the input of integrated circuit IC3 with capacitor C4 and resistor R10. Integrated circuit IC3 is a common timing circuit, such as National Semi. LM3905N, that, when triggered by a negative going edge from the output of IC2, provides a high output signal which is required to activate the electrically controlled switching means 5 into the conducting state. The high output signal from IC3 is maintained until IC3 is allowed to time out or supply voltage to IC3 from the voltage supply circuit drops below minimum operating level. Variable potentiometer R12 sets the adjustable time delay and resistor R13 provides a short minimum time delay. Resistors R12, R13 and capacitor C5 determine the total time delay carried out by timer IC3. Resistor R11 protects the internal circuitry of IC3 from excessive current discharge. The output of IC3 is coupled to the input of the electrically controlled switching means 5 through resistor R14 which acts as a current limiter.

Consider basic operation of the electrically controlled switching means 5. This circuit consists of the following components. Optoisolator IC4, such as Motorola MOC3012, which, when receiving a high output signal from IC3, supplies drive current to the gate of triac Q1 maintaining it in the conducting state. Resistor R15 limits the peak current into the gate of triac Q1 and resistor R1 minimizes false triggering of triac Q1 by noise pulses on the power line. Triac Q1 turns on when it receives a pulse of gate current from optoisolator IC4 and turns off when working current stops, which occurs at each zero crossing of power line voltage. When optoisolator IC4 is active (due to high output signal from IC3) it provides the required gate pulse to triac Q1 shortly after each zero crossing of power line voltage. This occurs because the gate current through IC4 comes directly from the line A.C. During the short time span when triac Q1 is turned off, power line voltage builds across its terminals. Optoisolator IC4 is configured to provide the required gate pulse when power line voltage builds to a maximum value (preferably about 15 volts). The momentary buildup of power line voltage across the terminals of triac Q1 is adequate to maintain required charge on capacitor C1. The delayed firing of triac Q1 causes a brief interruption of current to the load during each half cycle of power line voltage but loss of power to the load is trivial.

Now consider the operation of the time delay apparatus 4 in detail. The circuit responds differently to the three possible situations and each response will be analyzed individually.

OFF MODE represents the system at rest, that is switch S1 is open, there is no power being supplied to the load and the timer function is not active. In this case, full power line voltage is available across input lines 20 and 21 which in turn, through power supply circuit 7, provides required supply voltage for operation of control circuit 6. Half cycles of power line voltage are being detected by comparator IC1 which is producing square waves through transistor Q3. As discussed previously, these square waves have the effect of keeping the output of timer IC2 in the high state. Timer IC3 will not trigger until timer IC2's output produces a negative going edge. Therefore timer IC3 remains in a disabled condition and maintains a low output signal to the optoisolator IC4 which does not allow current through the gate of triac Q1 maintaining it in the nonconducting state. This is a stable state for the circuit and presents an extremely high impedance across lines 20 and 21 effectively preventing current from reaching the load 1.

MANUAL OPERATION occurs when switch S1 remains closed for a period of time longer than that of the trigger window period. First consider the changes that occur upon the closure of switch S1. A direct circuit to the load 1 is achieved through switch S1 and power line voltage is no longer available across input lines 20 and 21. Half cycles of power line voltage are no longer detected and comparator IC1 now produces a low output. This low output from IC1 maintains transistors Q3 and Q4 in the nonconducting state. Timer IC2 is no allowed to time out producing a negative going edge at the end of its short cycle. This negative going edge in turn triggers timer IC3 into its able state. The output of IC3 goes high and its time out sequence begins. Recall that no power line voltage has been available across input lines 20 and 21 since switch S1 was closed. The timeout of IC2 and triggering of IC3 have been accomplished using voltage supplied by the reserve charge left on capacitor C1 after switch S1 was closed. The reserve charge on capacitor C1 is depleted through operation of the integrated circuits and various leakage paths throughout the circuit. The end of the trigger window period arrives when voltage across capacitor C1 drops to the point where timer IC3 is disabled due to lack of adequate supply voltage. At this point the output of timer IC3 goes to the low state and the optoisolator IC4 prevents current from reaching the gate of triac Q1 reverting it to the nonconducting state. Therefore, allowing the trigger window period to expire while switch S1 remains closed puts triac Q1 in the nonconducting state after which opening of switch S1 will present an extremely high impedance across lines 20 and 21 effectively preventing current from reaching the load 1. This opening of switch S1 after expiration of the trigger window period returns the system to "off mode".

TIME DELAY OPERATION occurs when switch S1 is first closed and then reopened within the trigger window period. As previously discussed, closure of switch S1 causes timer IC3 to begin its time out sequence and in turn enables triac Q1 into the conducting state. Now consider the effects of reopening switch S1 before expiration of the trigger window period. Upon reopening of switch S1 current to the load 1 passes through triac Q1. The previously noted build up of power line voltage across the terminals of triac Q1 during each half wave allows capacitor C1 to recharge through bridge rectifier D1-D4 and series regulator transistor Q2. Thus, opening of switch S1 before expiration of the trigger window period insures that voltage across capacitor C1 remains above the minimum supply voltage required for continued operation of timer IC3. Therefore IC3 may complete its timeout. IC3's output will remain high for a period of time determined by adjustable potentiometer R12, resistor R13 and capacitor C5 and optoisolator IC4 maintains triac Q1 in the conducting state for the duration of IC3's timeout period. This has the effect of presenting an extremely low impedance across input lines 20 and 21 providing current to load 1 for the time period which was preselected by the adjustment of variable potentiometer R12. After completion of the timeout of IC3, its output goes low causing the optoisolator IC4 to put triac Q1 in the nonconducting state which presents an extremely high impedance across input lines 20 and 21 interrupting current to the load. This marks the end of time delay operation and returns the system to "off mode".

FIG. 3 shows the preferred embodiment of the circuit of FIG. 2 adapted to be mounted as an addition to a single pole switch into a standard wall switch receptacle. A circuit board 54 carries the elements of time delay apparatus 4 of FIG. 2 and is rigidly attached to the circuit casing 57 in a manner which allows variable potentiometer R12 to protrude from an opening in circuit casing 57 for means of adjusting the time delay period according to the scale so marked on circuit casing 57. Circuit input lines 20 and 21 are wired through openings in the back panel of circuit casing 57 and connected to printed circuit board 54. The other ends of circuit input lines 20 and 21 are fitted with spades 59 to facilitate connection to common single pole type switches. Circuit assembly mount bracket 56 attaches to circuit casing 57 by snap on means. 58 is an isolated heat sink element which is attached to circuit assembly mount bracket 56 with screws 55 to utilize the mount bracket for further heat sinking.

FIG. 4 shows the completed circuit assembly 63 positioned for addition to single pole type switch S1 and insertion into a conventional wall switch receptacle. Preprinted sticker 60 is attached to existing face plate 61 to inform the operator that the time delay function is available and the method of triggering. The face plate 61 may be of any decorative style or shape that matches switch S1. Switch S1 may be any single pole type switch intended for mounting in a standard wall receptacle including decorative, illuminated, quiet and mercury type switches. Circuit input line 21 and preinstalled line 2 are connected to switch terminal 51. Similarly circuit input line 20 and preinstalled line 3 are connected to the other switch terminal 50 (not shown). The length and flexibility of circuit input lines 20 and 21 allow for any configuration of terminals on switch S1. Circuit assembly 63 and switch S1 are rigidly mounted in wall switch receptacle 64 by means of screws 65 which are generally provided with switch S1. Wall plate 61 is mounted to switch S1 by existing means generally provided with the wall plate.

While the invention has been described as electrically connected in parallel with the switch controlling the load, and such connection results in operation of the apparatus as described, it is also possible to connect the apparatus in series with a switch controlling the load. Such a switch is shown as S2 in FIGS. 1 and 2. If switch S2 is opened, the voltage across switch S1 and across triac Q1 drops to zero. This has the same effect as closing switch S1. If open switch S2 is closed within the trigger window period, this has the same effect as opening switch S1 and the apparatus will operate to supply power to the load for the time delay period. Thus, when the apparatus is connected in series with a switch controlling the load, the load can be operated for the time delay period by opening and then closing again the switch within the trigger window period. Such operation does not require the presence of switch S1 and switch S1 can be eliminated from the circuit. In such case, only time delay operation of the load can be had.

If the apparatus is connected in parallel with a switch S1 which controls an electrical outlet rather than controlling a load such as a light directly, and the load plugged into the outlet also has its own switch S2, such as a lamp, with switch S2 closed as will normally be the case in such situation so that the lamp is controlled by switch S1, S1 can be operated to control the load in either normal or time delay mode as indicated above. In addition, while switch S1 is open, the switch S2 on the load itself can be operated, if desired, by opening it and then closing it again within the trigger window period to provide the time delay operation of the load.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore it is intended that the invention not be limited to the embodiment disclosed but that the invention include all embodiments falling within the scope of the claims.

I claim:

1. Time delay apparatus for use with a switch controlling supply of electrical power to an electrical load connected to the switch, said apparatus selectively continuing operation of the load for a predetermined time delay period after opening of the switch, comprising electrically controlled switching means adapted to be connected electrically in parallel with a switch controlling operation of a load; and control means for providing a control output signal to the electrically controlled switching means to cause operation thereof for a predetermined time delay period if the switch is closed to initiate operation of the load and then opened within a predetermined trigger window period, whereby when the switch is opened during the trigger window period, the electrically controlled switching means will maintain operation of the load for the time delay period in response to the presence of the control signal, but if the switch is not opened during the trigger window period, operation of the load ceases with opening of the switch.

2. Time delay apparatus according to claim 1, wherein the control means includes a control timer means for providing the control signal to the electrically controlled switching means during the time delay period if the control timer means is supplied with operating power, and power supply means adapted to be connected electrically in parallel with the switch controlling operation of the load to produce a power output for operating the control timer means during the time the switch is open and for the predetermined trigger window period after the switch is closed and remains closed.

3. Time delay apparatus according to claim 2, wherein the electrically controlled switching means periodically generates a sufficient voltage thereacross during delay period operation with the switch open to enable the power supply to supply power to the control timer means during such delay period operations.

4. Time delay apparatus according to claim 3, wherein the electrically controlled switching means includes isolation means to receive the control signal and generate an operation signal during presence of the control signal.

5. Time delay apparatus according to claim 4, wherein the isolation means generates a pulse operation signal.

6. Time delay apparatus according to claim 5, wherein the electrical power to be supplied to the load by the switch controlling the load is AC electrical power having an AC line voltage and wherein the pulse operation signal is synchronized with the AC line voltage to cause operation of the electrically controlled switching means after a partial build up of the AC line voltage across the electrically controlled switching means.

7. Time delay apparatus according to claim 6, wherein the isolation means is an optoisolator, and the operation signal from the optoisolator is generated by the AC line voltage during input of the control signal to the optoisolator.

8. Time delay apparatus according to claim 7, wherein the electrically controlled switching means is a triac.

9. Time delay apparatus according to claim 7, wherein the control means additionally includes a line voltage detector to detect presence of line voltage across the switch controlling the load and to provide a trigger signal to the control timer means to initiate timing by the control timer means of the time delay period upon sensing on absence of line voltage.

10. Time delay apparatus according to claim 9, wherein the line voltage detector includes a square wave generator responsive to the AC line voltage to produce a square wave output of similar frequency to the AC line voltage and a trigger timer triggered by each cycle of the square wave output of the square wave generator and having a time constant larger than the period of each square wave so that as long as a square wave is produced by the square wave generator, a constant output is produced by the trigger timer, but upon interruption of the square wave output for a period longer than the time constant of the trigger timer, the trigger timer output changes to initiate operation of the control timer means to begin timing of the time delay period.

11. Time delay apparatus according to claim 10, wherein the square wave generator includes a comparator which compares a varying voltage proportional to the AC line voltage with a reference voltage chosen to be between the expected high and low values of the varying voltage to thereby produce a square wave output.

12. Time delay apparatus according to claim 11, wherein the time delay period is determined by the time constant of a capacitance and resistance circuit and the resistance in the circuit includes a variable resistor which can be adjusted by a user to vary the resistance of said circuit and thereby adjust the time delay period.

13. Time delay apparatus according to claim 2, wherein the time delay period is determined by the time constant of a capacitance and resistance circuit and the resistance in the circuit includes a variable resistor which can be adjusted by a user to vary the resistance of said circuit and thereby adjust the time delay period.

14. Time delay apparatus according to claim 2, wherein the power supply means includes a capacitor for storing sufficient power to supply power to the control timer means during the trigger window period.

15. Time delay apparatus according to claim 1, wherein the time delay period is adjustable by the user.

16. Time delay apparatus according to claim 1, including a housing for the apparatus, and two electrical leads extending from the apparatus, and wherein the switch controlling supply of electrical power to the load includes two terminals for connection of the switch in a power line and one of said leads is adapted to be connected to one terminal of the switch and the other of said leads is adapted to be connected to the other terminal of said switch.

17. Time delay apparatus according to claim 16, wherein the housing is configured to be mounted in a standard electrical wall box behind the switch.

18. Time delay apparatus according to claim 17, wherein the housing serves as a heat sink for the apparatus.

19. Time delay apparatus for use with a switch controlling supply of electrical power to an electrical load connected to the switch, said apparatus continuing operation of the load for a predetermined time delay period, comprising an electrically controlled switching means connected in series with a line voltage; line voltage detector means for detecting the presence of voltage across the electrically controlled switching means; and control means for providing a control output signal to the electrically controlled switching means to cause operation thereof for a predetermined time delay period if voltage across the electrically controlled switching means is eliminated and then reestablished within a predetermined trigger window.

20. Time delay apparatus according to claim 19, wherein the control means includes a control timer means for providing the control signal to the electrically controlled switching means during the time delay period if the control timer means is supplied with operating power, and power supply means adapted to be connected electrically in parallel with the electrically controlled switching means to produce a power output for operating the control timer means during the time the voltage is present across the electrically controlled switching means and for the predetermined trigger window period after the voltage across the electrically controlled switching means is eliminated.

21. Time delay apparatus according to claim 20, wherein the electrically controlled switching means periodically generates a sufficient voltage thereacross during delay period operation to enable the power supply to supply power to the control timer means during such delay period operations.

22. Time delay apparatus according to claim 21, wherein the electrically controlled switching means includes isolation means to receive the control signal and generate an operation signal during presence of the control signal.

23. Time delay apparatus according to claim 22, wherein the isolation means generates a pulse operation signal.

24. Time delay apparatus according to claim 23, wherein the electrical power to be supplied to the load by the switch controlling the load is AC electrical power having an AC line voltage and wherein the pulse operation signal is synchronized with the AC line voltage to cause operation of the electrically controlled switching means after a partial build up of the AC line voltage across the electrically controlled switching means.

25. Time delay apparatus according to claim 24, wherein the isolation means is an optoisolator, and the operation signal from the optoisolator is generated by the AC line voltage during input of the control signal to the optoisolator.

26. Time delay apparatus according to claim 25, wherein the line voltage detector includes a square wave generator responsive to the AC line voltage to produce a square wave output of similar frequency to the AC line voltage and a trigger timer triggered by each cycle of the square wave output of the square wave generator and having a time constant larger than the period of each square wave so that as long as a square wave is produced by the square wave generator, a constant output is produced by the trigger timer, but upon interruption of the square wave output for a period longer than the time constant of the trigger timer, the trigger timer output changes to initiate operation of the control timer means to begin timing of the time delay period.

27. Time delay apparatus according to claim 26, wherein the square wave generator includes a comparator which compares a varying voltage proportional to the AC line voltage with a reference voltage chosen to be between the expected high and low values of the varying voltage to thereby produce a square wave output.

28. Time delay apparatus according to claim 27, wherein the time delay period is determined by the time constant of a capacitance and resistance circuit and the resistance in the circuit includes a variable resistor which can be adjusted by a user to vary the resistance of said circuit and thereby adjust the time delay period.

* * * * *